V. HOPKINS.
AUTOMOBILE RADIATOR ATTACHMENT.
APPLICATION FILED DEC. 3, 1917.
1,288,590.
Patented Dec. 24, 1918.
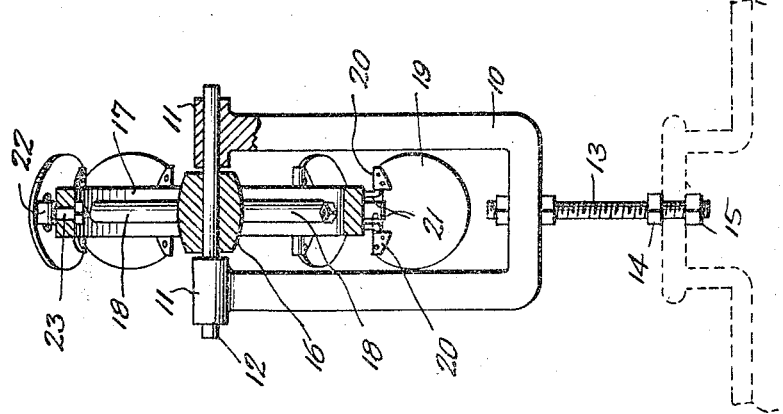
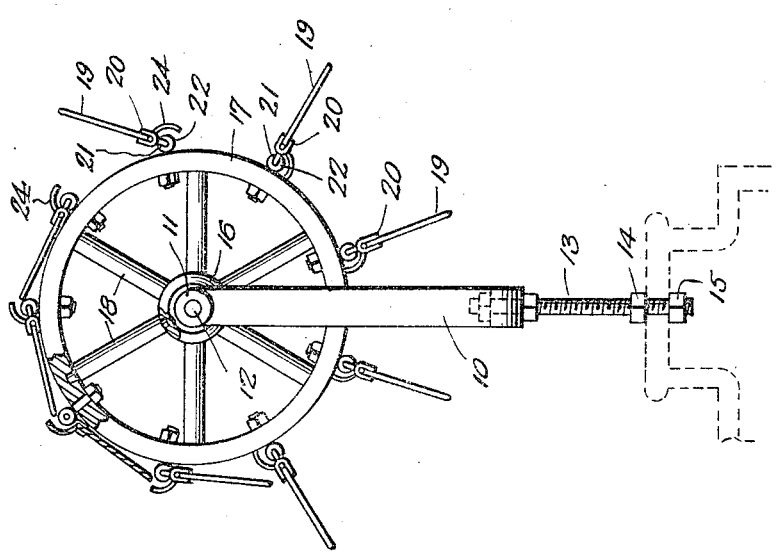
Inventor,
Vincent Hopkins
By Richard Ellwen
Atty.

UNITED STATES PATENT OFFICE.

VINCENT HOPKINS, OF COLUMBUS, OHIO.

AUTOMOBILE-RADIATOR ATTACHMENT.

1,288,590.  Specification of Letters Patent.  Patented Dec. 24, 1918.

Application filed December 3, 1917. Serial No. 205,204.

*To all whom it may concern:*

Be it known that I, VINCENT HOPKINS, a citizen of the United States, residing at Columbus, in the county of Franklin and State of Ohio, have invented certain new and useful Improvements in Automobile-Radiator Attachments, of which the following is a specification.

This invention relates to an improved paddle wheel for use upon the cap of an automobile radiator as a novelty and the principal object of the invention is to provide a paddle wheel so constructed that it may be easily rotated when the automobile is in motion, the paddles being so mounted that they will extend in an operative position along the lower portion of the wheel and recline in an inoperative position along the upper portion of the wheel.

Another object of the invention is to so mount these paddles that they will easily move to an operative position or to an inoperative position as the wheel rotates.

Another object of the invention is to so construct and mount these paddles that they will be braced when in an operative position and thus held in the best position for receiving action of the air.

This invention is illustrated in the accompanying drawings, wherein:—

Figure 1 is a view showing the improved paddle wheel in side elevation, one of the paddles and a portion of the wheel rim being shown in section, Fig. 2 is a view showing the improved paddle wheel partially in front elevation and partially in section.

This paddle wheel is provided with a yoke or bracket 10 having its arms extending upwardly and terminating in bearings 11 in which the axle 12 is mounted. This bracket carries a stem 13 which is threaded and will be passed through the cap of a radiator, securing nuts 14 and 15 being mounted upon the threaded stem so that the wheel will be securely fastened to the cap. The wheel is provided with a hub 16 and rim 17, the rim being supported from the hub through the medium of spokes 18. The paddle blades 19 are positioned about the wheel and carry bearings 20 in which the arms or pins 21 will be firmly mounted. These pins or arms 21 have their free end portions mounted in the heads 22 of the bearing bolts 23 carried by the rim 17 and from an inspection of Fig. 1, it will be readily seen that as the wheel rotates, the blades will move into and out of an operative position. Bracing arms 24 serving as abutments extend from the pivoted inner end portions of the blades and engage the rim of the wheel when the blades are in an operative position, thus holding the blades extended in radiating relation to the hub so that they can receive the best action from the wind or draft created when the automobile is in motion. It will thus be seen that there has been provided a novelty paddle wheel which may be connected with the cap of a radiator and which will rotate when the automobile is in motion or if there is sufficient wind blowing when the automobile is standing still.

What is claimed is:—

1. A paddle wheel comprising a bracket, an axle carried by the bracket, a wheel carried by the axle within the bracket, bearing bolts carried by the rim of the wheel, paddles, bearings carried by the paddles, arms carried by the bearings of the paddles and mounted in the heads of the bearing bolts, and bracing arms extending from the inner end portions of the paddles to engage the rim of the wheel and hold the paddles against swinging movement in one direction beyond a position in radiating relation to the hub of the wheel.

2. A paddle wheel comprising a bearing bracket, a stem for the bearing bracket for connection with the top of an automobile radiator, an axle carried by the bearing bracket, a wheel carried by the axle within the bearing bracket, bearings carried by the rim of the wheel, paddle blades, arms connected with the paddle blades and mounted in the bearings of the wheel rim, and bracing arms extending from the paddle blades for engaging the rim of the wheel and limiting swinging movement of the paddle blades in one direction.

3. A paddle wheel comprising a bearing bracket, a supporting stem for the bearing bracket, a wheel rotatably mounted in the bearing bracket, bearings carried by the rim of the wheel, paddle blades pivotally connected with the bearings of the wheel rim, and bracing arms extending from the paddle blades to engage the wheel rim and limit swinging movement of the paddle blades in one direction.

4. An attachment of the character described comprising a bracket including spaced side arms connected together at one end, an attaching stem extending from the connected ends of said arm, a shaft journaled in the free ends of said arms, a rotatable wheel mounted on said shaft, and a plurality of movable paddles carried by said wheel.

In testimony whereof I affix my signature in presence of two witnesses.

VINCENT HOPKINS.

Witnesses:
CORA HOPKINS,
BERT WOLMAN.